United States Patent [19]
Kientz et al.

[11] Patent Number: 5,885,670
[45] Date of Patent: Mar. 23, 1999

[54] CONVENTIONAL DIRECT GLAZING

[75] Inventors: Paul Kientz; Andreas Schäfer, both of Wadern, Germany

[73] Assignee: Saar-Gummiwerk GmbH, Wadern, Germany

[21] Appl. No.: 849,985

[22] PCT Filed: Oct. 16, 1996

[86] PCT No.: PCT/DE96/01959

§ 371 Date: Jun. 19, 1997

§ 102(e) Date: Jun. 19, 1997

[87] PCT Pub. No.: WO97/14571

PCT Pub. Date: Apr. 24, 1997

[30] Foreign Application Priority Data

Oct. 19, 1995 [DE] Germany .................. 195 38 939.5

[51] Int. Cl.⁶ ........................................ B32B 4/00
[52] U.S. Cl. ................. 428/34; 428/38; 428/77; 428/122; 428/192; 428/210; 428/410; 428/417; 428/425.6; 428/426; 296/90; 296/93; 156/309.9; 156/322
[58] Field of Search .................. 428/192, 410, 428/31, 77, 122, 210, 417, 38, 34.4, 425.6, 83, 428, 120, 426, 34; 296/93, 90; 52/308, 202, 204.591, 204.705; 156/108, 293, 73.1, 322, 306.6, 273.3, 309.9; 219/535, 202, 203

[56] References Cited

U.S. PATENT DOCUMENTS

| 3,574,024 | 4/1971 | Rose | 156/108 |
| 4,635,420 | 1/1987 | Batky | 52/309.1 |

FOREIGN PATENT DOCUMENTS

| 0402254 | 12/1990 | European Pat. Off. . |
| 0521825 | 1/1993 | European Pat. Off. . |
| 2716416 | 8/1995 | France . |

*Primary Examiner*—William Krynski
*Assistant Examiner*—Abraham Bahta
*Attorney, Agent, or Firm*—James Creighton Wray; Meera P. Narasimhan

[57] ABSTRACT

The Conventional Direct Glazing invention concerns a process for securing fixed panes of inorganic or organic glass to vehicles or parts thereof, in which flexible structural components and or sealing strips are prefitted by a weld strip between them and the pane by thermally activating the weld strip and thus producing a seaming effect on the pane, and pane modules thus produced. A pane module thus produced can subsequently be conventionally fitted to the coachwork on the assembly line using fitting strings without any further auxiliaries and working process. Owing to the material used for the flexible structural component and or sealing strip, the sealing quality corresponds to that of direct glazing. If the residual heat from the manufacture of the pane is used as the activation heat for the sealing strip, considerable economies are achieved in the manufacturing process for the pane module.

14 Claims, No Drawings

CONVENTIONAL DIRECT GLAZING

The invention concerns a process for securing flexible elastic structural components and or sealing strips with transparent to translucent panes in a long-lasting, firm, and seal-tight manner to vehicle or vehicle parts made of inorganic or organic glass or combinations of the same as well as a pane for vehicles or vehicle parts firmly and tightly sealed to a flexible elastic structural component and or sealing strip.

Currently, the process of the glazing technique for glazing fixed panes, particularly vehicle windows, is carried out in that most fixed vehicle windows are attached directly onto the vehicle body; that is, they are attached by applying force.

This technology, wherein the pane is cleaned, pretreated, and provided with mounting adhesive when still on the assembly line, is called direct glazing because the pane is attached directly into the vehicle body opening.

The following advantages become evident within this process:

Rapid and rational assembly even when using assembly robots;
No more sealing problems;
Increase in body rigidity;
Very high stylistic degree of freedom since the pane contour can be freely selected;
Possible glazing onto the body—flash glazing;
Anti-theft protection;
Good noise reduction; and
In case of accident, the pane does not detach from the body.

Considerable disadvantages also stand in the way of this process and appear mainly when it is necessary to dismantle the pane.

In the case that it becomes necessary—still at the vehicle manufacturer plant—to repaint the vehicle (this affects approximately 20% of the vehicles), the panes must be either removed or dismantled. In case of damage due to accident that requires the removal of the pane, the same is cut from the flange with a knife or wire. For this purpose, the inside lining of the vehicle must be removed beforehand in many cases in order to obtain access to the inner side of the adhesion area. If the flange is damaged during separation, repairs are costly; there is also the danger of damaging the sealing strip that is connected to the pane, which would require the use of a new pane module.

The disadvantages of direct glazing are summarized in the following:

Expensive process;
High cost;
Very complicated dismantling of the pane, therefore very costly, high repair expense, and consequently high insurance rating;
Very high costs for repainting due to the expensive dismantling;
Support needed for the pane up to the first setting of the adhesive; and
Costly removal of the panes for recycling.

The technologic preliminary step used for direct glazing was the conventional glazing technique, the so-called conventional glazing. In this process, the pane to be built into the body is first framed with a sealing strip and forms in this way the pane module, that is, the structural module that is built in, as a unit. The pane module is then pulled in through a body opening by means of a fitting string placed inside the metal frame of the vehicle body during preassembly.

The following advantages become evident in conventional glazing:

Cost-effective system in comparison to direct glazing;
No high costs at the assembly line;
No black coloring of the pane or areas of the pane needed; and
Removal and replacement of pane is carried out without problems, resulting in lower repair costs and lower insurance rating.

The disadvantages of this process that finally decided the manufacture for direct glazing were:

Possible unsealed areas between glass and seal as well as also between seal and body;
Reduced stylistic possibilities—no flash glazing possible;
Angular panes can only be installed into the seal with the aid of form pieces;
Fixing of the pane is possible only on the pane edge; and
Preassembly of the pane module (seal/pane) required by manufacturer.

The object of the invention is, therefore, to develop a process for a glazing technique that especially does not have the disadvantages of direct glazing, without however giving up the many cited advantages. Other aspects such as, for example, the use of recyclable raw materials should also be taken into consideration.

The object of the invention is attained in that the flexible structural components and or sealing strips are placed on the pane, in that a thermally activated weld strip is placed between the flexible structural component and or sealing strip and the pane, and in that the weld strip is thermally activated before mounting the panes onto the vehicles or vehicle parts.

It is not important if the pane geometry or the geometry of the installation area is flat or curved or if the installation area takes up the weld strip completely or partially since this places only different demands with respect to the sealing parts to be brought into contact with the weld strip and the kind of heat supply for the thermal activation of the weld strip.

It is also unimportant according to which physical effect principle (high frequency, ultrasound, hot air, heating plates . . . ) is used in activating heat to the weld strip. It is, however, economically sound and it reduces costs considerably if the heat for the thermal activation of the weld strip is taken from the residual heat remaining in the pane after its manufacture.

All elastomers of natural rubber (NR) or ethylene-propylene-terpolymer (EPDM) or thermoplastic elastomer (TPE) or a similar flexible material can be considered suitable materials for the flexible structural component and sealing strip.

The pane module can now be installed in a conventional manner into the vehicle body according to the process of the invention without extruding the sealing strip onto the pane and without gluing it to the vehicle body which causes the mentioned disadvantages. In this respect, the attempts with thermoplastic elastomers (TPE) on a base of olefines, styrols, and urethane have so far been unsatisfactory due to bad sealing properties.

Therefore, the pane module structured according to the invention represents a complete glazing system and can be seen as an independent structural module for the vehicle assembly.

The following special advantages of the glazing process of conventional direct glazing become apparent after selecting, according to the invention, the material for the flexible structural component or sealing strip to form the pane modules:

No extra costs for the manufacturer;

Preassembly is eliminated;

Sealing and fixing of the pane is no longer limited to the pane edge;

Higher stylistic freedom, for example, making angled panes possible;

Panes larger than the vehicle body openings are possible;

Easy recycling;

Installation and removal of the pane is possible without problems, that is, economic repainting of the pane area and lower insurance rating;

No unsealed areas between the pane and the flexible sealing strip or the structural component due to the system and no unsealed areas between the vehicle body and the flexible sealing strip or structural element due to the selected material.

The development of securely fixed and rationally mounted glazing leads to the use of pane modules as structural modules. As such are understood, assembly-friendly panes, which the pane manufacturer already ensures, are adapted to the even narrower space on the assembly line. Chemical processes are avoided by the vehicle manufacturers for hygienic and physiologic working conditions, and the safe continuous rolling of the assembly line is ensured.

The process of conventional direct glazing, according to the invention carried out according to the conventional flexible glass technique, retains the advantages of the modern glazing techniques, particularly those wherein preassembled pane modules are delivered as structural modules to the vehicle manufacturer. They no longer require chemical processes at the assembly line and also offer wider stylistic possibilities. With sealing qualities comparable to those of the flexible glazing, it also fulfills the expectations for a glazing technique that endures the assembly.

The process possesses, in combination with the inventive arrangement of the weld strip as sealing intermediate strip, application possibilities on panes made of inorganic glass or simple borate and phosphate glass to aluminum silicate glass to such complicated combinations as organic glass such as, for example, polycarbonate glass (PC glass), polystyrol glass (PS glass), or glass of the phthalate family.

The process of the invention can, even in geometrically complicated pane shapes such as, for example, the surface area of spotlights that represent an enclosed body, be applied successfully due to is variability.

We claim:

1. A process for tightly securing seals to glass panes comprising the step of providing a flexible elastic seal on a pane, providing a thermally activatable weld strip between the flexible elastic seal and the pane, and thermally activating the weld strip before mounting the pane with the elastic seal on a vehicle.

2. The process of claim 1, wherein the thermally activating step comprises thermally activating the weld strip by using residual heat remaining in the pane after its manufacture.

3. The process of claim 2, wherein the using the residual heat comprises using partial residual heat.

4. The process of claim 2, wherein the using the residual heat comprises using total residual heat.

5. The process of claim 1, wherein the thermally activating comprises thermally activating the weld strip by electromagnetic oscillations.

6. The process of claim 1, wherein the thermally activating comprises thermally activating the weld strip by ultrasound waves.

7. The process of claim 1, wherein the thermally activating comprises thermally activating the weld strip by hot air.

8. The process of claim 1, wherein the thermally activating comprises thermally activating the weld strip by a heating plate.

9. The process of claim 1, wherein the thermally activating comprises thermally activating the weld strip by heating wires.

10. A process for firmly securing flexible elastic sealing strips to glass panes on vehicles comprising the steps of providing the sealing strips on the panes, providing thermally activated weld strips between the sealing strips and the pane, and thermally activating the weld strips before mounting the panes on the vehicles.

11. The process of claim 10, wherein the weld strip is thermally activated by residual heat remaining in the pane after the pane has been manufactured.

12. The process of claim 10, wherein the weld strip is thermally activated by electromagnetic oscillations.

13. The process of claim 10, wherein the weld strip is thermally activated by ultrasound waves.

14. The process of claim 10, wherein the weld strip is thermally activated by providing heat selected from a heat source consisting of hot air supply, heating plate or heating wires.

* * * * *